Patented Aug. 1, 1950

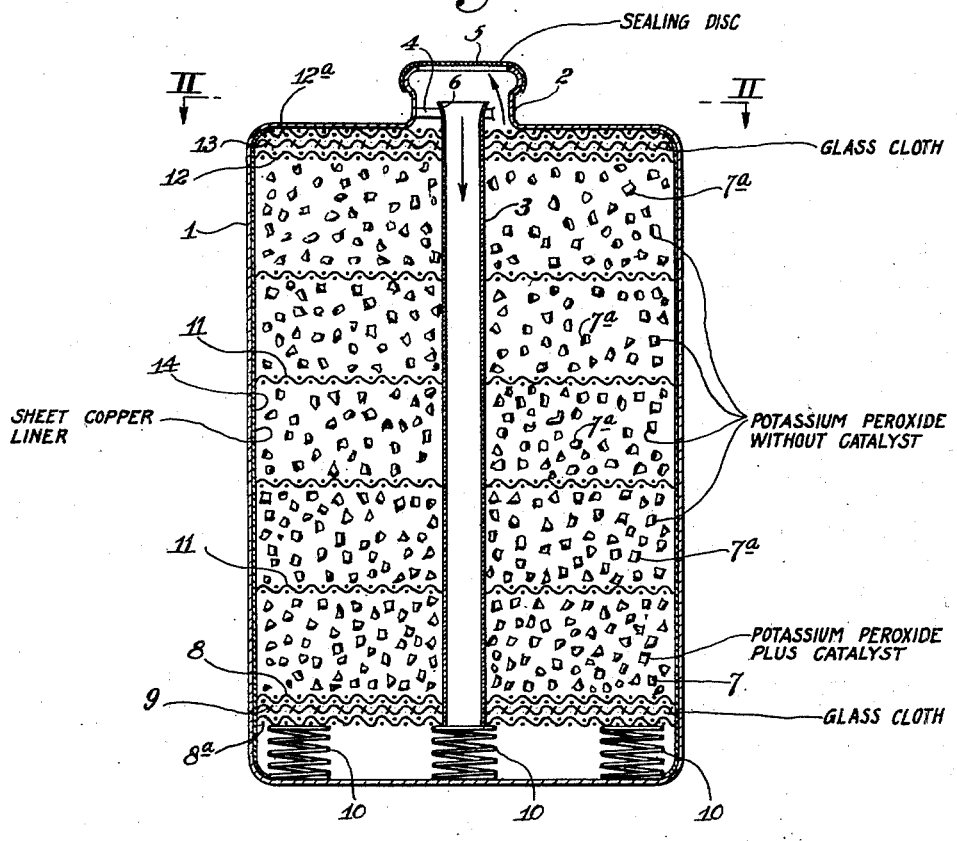
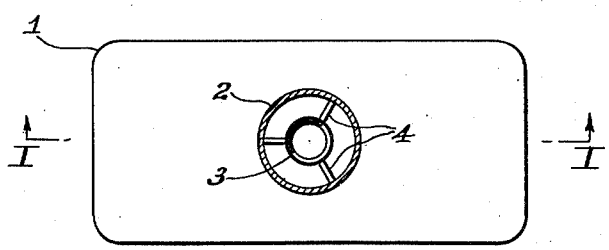

2,517,209

UNITED STATES PATENT OFFICE 2,517,209

OXYGEN LIBERATING CANISTER

Carey B. Jackson, Forest Hills, and Alfred C. Van Andel, Harmony, Pa., assignors to Mine Safety Appliances Company, Pittsburgh, Pa., a corporation of Pennsylvania Application July 2, 1947, Serial No. 758,620

8 Claims. (Cl. 23—281)

This invention relates to canisters for breathing apparatus of the self-contained, or rebreathing, type.

Self-contained breathing apparatus of the type contemplated herein comprise a canister containing material reactive with exhaled air to remove carbon dioxide added and restore the oxygen lost in respiration, a facepiece, and connections between the facepiece and canister for passing exhaled air to and through the canister, and for returning regenerated air to the facepiece for rebreathing. Such apparatus, as is known, is useful for work in irrespirable atmospheres, e. g., where there is an oxygen deficiency; they have been used widely, and their use is growing rapidly.

It has been long known that alkali metal peroxides constitute especially suitable regenerating chemicals for use in such canisters. Ideally they will exchange the carbon dioxide of exhaled air for an equivalent amount of oxygen, and thus they maintain the air circulating in the apparatus fit for breathing. Although any of the alkali metal peroxides are thus utilizable, for reasons of economy, only the peroxides of sodium and potassium have been used for such purposes. Because potassium tetroxide ($K_2O_4$) is theoretically capable of supplying 236 cc. of oxygen per gram, it has of recent years largely supplanted sodium peroxide ($Na_2O_2$), which was first used for this purpose but which is theoretically capable of releasing only about 143 cc. of oxygen per gram as a result of carbon dioxide exchange.

Canisters containing those peroxides have been produced in very large numbers, especially for military purposes. Down to the time of this invention the standard practice has been to mix the peroxide with a catalyst that promotes the exchange reaction. Thus, one procedure is to mix the powdered peroxide with a small amount of the catalyst and then to granulate the mixture, as by compressing it and then crushing the pressed material to form granules that afford adequate contact surface for the exhaled air passed through the canister without causing undue breathing resistance.

Heretofore the canisters have been filled with such catalyzed granular materials, most commonly by packing the canister with a plurality of layers of the granular material separated by wire screens. Experience has shown that although the use of a catalyst is desirable, nevertheless, at least in the case of $K_2O_4$ its presence causes oxygen to be liberated at a rate greater than is needed, and also that in consequence enough heat is liberated in the use of the canister to cause fritting of the granules in the portion of the canister adjacent the regenerated air outlet. Both of those results are undesirable. Thus, the life of the canister is reduced through excessive oxygen liberation, and this is objectionable because it may necessitate returning to a respirable atmosphere to exchange the exhausted canister for a fresh one. Also, such breathing apparatus is customarily used by those engaged in active labor, as in mine rescue work, and any increased breathing resistance due to fritting of the granular material adds to their burden and may reduce their efficiency or cause undue fatigue.

A major object of the present invention is to provide potassium tetroxide canisters for self-contained breathing apparatus which as compared with prior canisters of the same type possess increased life, whose breathing resistance does not increase materially during use, and which may be produced in accordance with existing practice and without any complicated changes.

Other objects will appear from the following specification.

The invention will be described with reference to the accompanying drawings representing its preferred embodiment and in which Fig. 1 is a vertical sectional view through the canister taken on line I—I, Fig. 2; and Fig. 2 a horizontal sectional view illustrative of a detail of construction taken on line II—II, Fig. 1.

We have discovered, and it is upon this that the invention is predicated, that the disadvantages alluded to above that have been encountered with potassium tetroxide breathing apparatus canisters can be overcome without introducing any complicating or disadvantageous factors by providing the canister with only a small proportion of catalyzed potassium tetroxide disposed for contact with the exhaled air as it enters the canister, and by using uncatalyzed potassium tetroxide for the remainder of the filling, through which the air to be regenerated passes after it has contacted the catalyzed material.

In the preferred embodiment of the invention we accomplish this, by a simple modification of existing practice, namely, by forming the layer of chemical which the exhaled air first contacts in passing through the canister from catalyzed potassium tetroxide, i. e., granular catalyzed potassium tetroxide such as has been used heretofore, and then forming the remainder of the charge, suitably in layers, from granular potassium tetroxide in uncatalyzed form. Most suitably, the layer of catalyzed peroxide is composed of granules of potassium tetroxide containing catalyst and water in an amount such that the material shows a loss of about 8 to 12 cc. of oxygen per gram when heated at 125° C. Such an oxygen loss corresponds approximately to about 0.02 to 0.06 mol of water per mol of tetroxide. The remainder consists of granulated potassium tetroxide free from catalyst and as free from water as it can be made, in which condition it will exhibit an oxygen loss of not over 6 cc. per gram when heated at 125° C.

For most purposes we prefer to use copper oxychloride, suitably about 1 per cent by weight, as a catalyst. Other catalysts known in the art that promote the carbon dioxide-oxygen exchange may be used, however, such, for example, as nickel oxide, manganese dioxide, and any of the various cobalt oxides.

The invention may be described further with reference to a particular form of canister shown in the drawings. It comprises a casing 1, suitably of metal such as sheet iron, provided with an inlet for exhaled air and an outlet for regenerated air. Although the canisters for these purposes may take various forms to that end, we now prefer to use that shown in Patent No. 2,403,981, granted July 6, 1946. Such a canister includes, as seen in the drawings, a neck portion 2 for association, by appropriate connections, with a facepiece. Mounted concentrically within and spaced from neck 2 is a tubular inlet member 3 which extends almost to the bottom of the canister, and which is supported rigidly by a spider 4 connected, as by brazing or spot welding, to the canister. After the canister has been filled the mouth of neck 2 is closed by a temporary sealing member 5, for instance copper foil that covers the opening and makes an air-tight seal. When the canister is placed in use the sealing disc 5 is ruptured by an element of the breathing apparatus that seats against the upper flanged part 6 of tube 3 and is connected to the facepiece in such manner that the exhaled air enters the canister through tube 3 which discharges it adjacent the bottom of the canister. Another part of the same element then receives the regenerated air that leaves the canister through the annular space between neck 2 and tube 3 and returns it through an appropriate connection to the facepiece for rebreathing. The details of that element and other portions of the breathing apparatus form no part of the present invention but are to be found in the foregoing patent, to which reference is made for such details.

In accordance with this invention the canister is provided adjacent the exit end of tube 3 with a layer 7 of catalyzed granular potassium tetroxide. This may be made by mixing potassium tetroxide with the desired amount of catalyst, compressing the mixture, and then crushing the pressed material to form granules that are screened to segregate the granules of proper size from fines and oversize material. Preferably the potassium tetroxide is made by atomizing molten potassium in a stream of an oxidizing gas, such as air, supplied in an amount such as to provide an excess of oxygen and also to quench the peroxide below its melting point as quickly as it is formed, as disclosed in U. S. Patent No. 2,405,580, granted August 13, 1946, on an application filed by one of us.

Below layer 7 and supporting it are a pair of transverse wire screens 8 and 8a between which is a layer of filtering material of low breathing resistance, such as a disc 9 of glass cloth. Spring members 10 disposed between the bottom of the canister and screen 8a urge the screens upwardly.

The remainder of the charge is made up from granulated potassium tetroxide that contains no added catalyst, and this may be made by simple pressing and granulation of the tetroxide. Most suitably this filling of uncatalyzed tetroxide is in the form of individual layers 7a separated by wire screens 11. Above the uppermost layer 7a there are disposed a screen member 12 in contact with the tetroxide, an overlying disc 13 of filtering material of low breathing resistance, such as glass cloth, and an uppermost wire screen 12a.

Springs 10 acting upon screen 8a hold the granular charge firmly in place during transportation, handling, and use of the canister. This avoids the abrasive action with formation of fines that might occur if the granules were loose and free to rub against one another. Filter discs 9 and 13 act to prevent the passage of any peroxide dust to the facepiece.

As indicated above, we prefer that the granular material of layers 7a be made under conditions that keep it as free from water as possible, and that the oxygen loss upon heating be as stated above. Also, in the production of the catalyzed material of layer 7 the granules are intentionally provided with a small but critical amount of water, as determined by the test stated above, as disclosed in a copending application, Serial No. 551,055, filed by one of us on August 24, 1944, because this critical amount of water causes prompt initiation of the exchange reaction at temperatures much lower than would otherwise be possible.

As indicating the benefits to be derived from the invention, experience has shown that with a canister of the type shown in the drawings and of a size that has been used in very large numbers, when the filling is in accordance with prior practice made wholly of catalyzed granular potassium tetroxide, the average life of the canister is about 45 minutes when used in an apparatus by a man performing active labor. In contrast, the life of a canister of the same size when constructed in accordance with the present invention averages 60 minutes, and the excessive heating with concomitant fritting of the granules that was experienced with prior fillings is avoided, or at least minimized.

Although the invention has been described with particular reference to a specific form of canister, it will be understood that various modifications are permissible without departing from the invention. For example, the canisters may be of a conventional type that have an inlet opening at one end and an outlet opening at the other end. Also, the bodies of catalyzed and uncatalyzed tetroxide might be disposed other than as screen-separated layers, provided, of course, that the catalyzed material is contacted first by the air that is to be regenerated.

Again, although reference has been made to a canister constructed from sheet iron, it might be constructed from copper, or sheet iron canisters may, with advantage, be provided with a liner 14 formed from thin copper sheet that is in contact with the body of the canister. The advantage of using a copper liner is that in the event that any oxidizable material such as a small piece of wood or rubber, finds its way into the filling, destruction of the canister with possible injury to the user, is avoided. The same results might be attained by making the canister of copper but copper shells are more easily dented or otherwise mechanically damaged than those of sheet iron for which reason sheet iron canisters with copper liners are preferable.

Still other modifications in detail are permissible. For instance, other types of temporary closures to protect the canister charge prior to use are available, and the canisters may be used with various types of rebreathing apparatus other than that disclosed in the foregoing patent.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A canister for self-contained breathing apparatus comprising a casing provided with an inlet for exhaled air and an outlet for regenerated air, sealing means against ingress of air until put in use, a layer of granular potassium tetroxide having distributed through the granules a catalyst promoting reaction between the potassium tetroxide and carbon dioxide in the exhaled air disposed in said casing adjacent said inlet, and a body of granular potassium tetroxide in uncatalyzed form disposed in the casing between the aforesaid catalyzed layer and said outlet.

2. A canister according to claim 1, said catalyst being selected from the group consisting of copper oxychloride, nickel oxide, cobalt oxides, and manganese dioxide.

3. A canister according to claim 1, said catalyzed tetroxide containing water limited in amount to that which causes an oxygen loss of about 8 to 12 cc. per gram of tetroxide when heated to 125° C.

4. A canister according to claim 3, and said uncatalyzed tetroxide having an oxygen loss of not over about 6 cc. per gram when heated to 125° C.

5. A canister for self-contained breathing apparatus comprising a metallic casing provided with an inlet for exhaled air and an outlet for regenerated air, sealing means against ingress of air until put in use, a layer of granular potassium tetroxide having distributed through the granules a minor proportion of copper oxychloride catalyst disposed in the casing adjacent said inlet, and a body of granular potassium tetroxide in uncatalyzed form disposed in the casing between the aforesaid layer and said outlet, said tetroxide with said catalyst carrying also water in an amount such as to cause an oxygen loss of about 8 to 12 cc. per gram of tetroxide when heated to 125° C., and the uncatalyzed tetroxide body having an oxygen loss not over about 6 cc. per gram when heated at 125° C. and being substantially four times as thick as said layer containing catalyst.

6. A canister for self-contained breathing apparatus comprising a metallic casing having a single opening for association with the facepiece of the apparatus, a tube mounted substantially coaxially within said opening extending adjacent the bottom of the canister and forming with said opening an annular passage from the top of the canister, a temporary closure for said opening, a layer of granular potassium tetroxide having distributed through it a catalyst promoting reaction between the tetroxide and carbon dioxide in exhaled air and disposed to be traversed by exhaled air discharged from the extended end of said tube, and at least one layer of granular uncatalyzed potassium tetroxide substantially four times as thick as said layer containing catalyst disposed between said layer of catalyzed tetroxide and the top of the canister to be traversed by air in passing from said catalyzed layer to said annular passage.

7. A canister according to claim 6, said catalyst being selected from the group consisting of copper oxychloride, nickel oxide, cobalt oxides, and manganese dioxide.

8. A canister for self-contained breathing apparatus comprising a metallic casing have a single opening for association with the facepiece of the apparatus, a tube mounted substantially coaxially within said opening extending adjacent the bottom of the canister and forming with said opening an annular passage from the top of the canister, a temporary closure for said opening, a layer of granular potassium tetroxide having distributed through it a catalyst promoting reaction between the tetroxide and carbon dioxide in exhaled air and disposed to be traversed by exhaled air discharged from the extended end of said tube, said tetroxide also carrying water in an amount such that the oxygen loss upon heating to 125° C. is about 8 to 12 cc. per gram, and at least one layer of granular uncatalyzed potassium tetroxide substantially four times as thick as said layer containing catalyst disposed between said layer of catalyzed tetroxide and the tube of the canister to be traversed by air in passing from said catalyzed layer to said annular passage, and said uncatalyzed tetroxide having an oxygen loss upon heating to 125° C. of not over about 6 cc. per gram.

CAREY B. JACKSON.
ALFRED C. VAN ANDEL.

REFERENCES CITED

The following references are of record in the file of this patent:

UNITED STATES PATENTS

| Number | Name | Date |
| --- | --- | --- |
| 1,789,194 | Rockwell | Jan. 13, 1931 |
| 2,160,542 | Gerson | May 30, 1939 |
| 2,389,225 | Wieczorek | Nov. 20, 1945 |